United States Patent
Tanigawa (10) Patent No.: US 7,085,423 B2
(45) Date of Patent: Aug. 1, 2006

(54) APPARATUS AND METHOD FOR FILING AND REPRODUCING IMAGES

(75) Inventor: Satohide Tanigawa, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 693 days.

(21) Appl. No.: 10/108,346

(22) Filed: Mar. 29, 2002

(65) Prior Publication Data

US 2002/0141648 A1    Oct. 3, 2002

(30) Foreign Application Priority Data

Mar. 30, 2001    (JP)    ............... P2001-102456

(51) Int. Cl.
*G06K 9/34*    (2006.01)
*G06K 9/36*    (2006.01)

(52) U.S. Cl. ............ 382/239; 382/175; 382/181

(58) Field of Classification Search ........ 382/173–180, 382/199, 224, 236–239, 242–251; 358/539, 358/448

See application file for complete search history.

(56) References Cited

U.S. PATENT DOCUMENTS

| 5,459,827 | A | * | 10/1995 | Allouche et al. | ........... | 715/513 |
| 5,502,777 | A | * | 3/1996 | Ikemure | ............. | 382/173 |
| 6,721,451 | B1 | * | 4/2004 | Ishitani | .............. | 382/181 |

FOREIGN PATENT DOCUMENTS

JP    11-86014    3/1999

* cited by examiner

*Primary Examiner*—Duy M. Dang
(74) *Attorney, Agent, or Firm*—Finnegan, Henderson, Farabow, Garrett & Dunner, L.L.P.

(57) ABSTRACT

The invention provides a data filing device for storing an original image as one electronic file by not uniformly encoding but in different systems for each of parts in the original image. The data filing device includes an analyzer for analyzing a layout of a construction for an original image; a partial images encoder for sorting the original images into classifications of partial images and for individually encoding the partial images; and a data storage unit for storing data by combining the individually encoded data and a corresponding encoding attribute data as one image data in accordance with a predetermined format.

16 Claims, 10 Drawing Sheets

↓ LAYOUT STRUCTURE ANALYSIS

FIG.6A (HEADER)

RESOLUTION:400dpi
IMAGE SIZE:hWo,Ho
NUMBER OF PARTIAL IMAGES:5
START POSITION OF PARTIAL
   IMAGE DATA:0 × 43

FIG.6B

PARTIAL IMAGE:501
RESOLUTION:200dpi
POSITION:(xa,ya)/(xa+Wa,ya+Ha)
DATA SIZE:XXXX byte
ENCODING SYSTEM:0
START POSITION OF
   ENCODING DATA:0 × 132
ENCIPHERING KEY:0
ENCODED DATA
   (START POSITION:0 × 132)
ENCODED DATA
ENCODED DATA
ENCODED DATA
ENCODED DATA

FIG.6C

PARTIAL IMAGE:502
RESOLUTION:200dpi
POSITION:(xb,yb)/(xb+Wb,yb+Hb)
DATA SIZE:XXXX byte
ENCODING SYSTEM:0
START POSITION OF
   ENCODING DATA:0 × 2c3
ENCIPHERING KEY:0
ENCODED DATA
   (START POSITION:0 × 2c3)
ENCODED DATA
ENCODED DATA
ENCODED DATA
ENCODED DATA

FIG.6D

PARTIAL IMAGE:503
RESOLUTION:400dpi
POSITION:(xc,yc)/(xc+Wc,yc+Hc)
DATA SIZE:XXXX byte
ENCODING SYSTEM:1
START POSITION OF
   ENCODING DATA:0 × 800
ENCIPHERING KEY:0
ENCODED DATA
   (START POSITION:0 × 800)
ENCODED DATA
ENCODED DATA
ENCODED DATA
ENCODED DATA

FIG.6E

PARTIAL IMAGE:504
RESOLUTION:200dpi
POSITION:(xd,yd)/(xd+Wd,yd+Hd)
DATA SIZE:XXXX byte
ENCODING SYSTEM:0
START POSITION OF
   ENCODING DATA:0 × a26
ENCIPHERING KEY:0
ENCODED DATA
   (START POSITION:0 × a26)
ENCODED DATA
ENCODED DATA
ENCODED DATA
ENCODED DATA

FIG.6F

PARTIAL IMAGE:505
RESOLUTION:200dpi
POSITION:(xd,yd)/(xd+Wd,yd+Hd)
DATA SIZE:XXXX byte
ENCODING SYSTEM:2
START POSITION OF
   ENCODING DATA:0 × c52
ENCIPHERING KEY:qdcp4dg
ENCODED DATA
   (START POSITION:0 × c52)
ENCODED DATA
ENCODED DATA
ENCODED DATA
ENCODED DATA

PARTIAL IMAGE:503
RESOLUTION:400dpi
POSITION:(xc,yc)/(xc+Wc,yc+Hc)
DATA SIZE:XXXX byte
ENCODING SYSTEM:99
START POSITION OF
  ENCODING DATA:0 × 800
ENCIPHERING KEY:0
ENCODING DATA
  (START POSITION :0 × 800)
./ EXTERAL FILE NAME :/fig2321.jpg

FIG.11B fig2321.jpg

FIG.11C

COMPOSITION OF EXTERNAL DATA

REFERENCE

APPARATUS AND METHOD FOR FILING AND REPRODUCING IMAGES

CROSS-REFERENCE TO RELATED APPLICATIONS

This application claims the benefit of Japanese Patent Application No. 2001-102456, filed on Mar. 30, 2001, the contents of which are expressly incorporated herein by reference in their entirety.

BACKGROUND OF THE INVENTION

1. Field of the Invention

The present invention relates to apparatus and methods for filing and reproducing images, and more particularly, to such novel apparatus and methods for generating, storing, and reproducing electronic image files of original information, such as documents or photographs.

2. Description of the Related Art

Conventionally, when such documents or photographs are stored as image data, the original image information is electronically processed in accordance with a generalized image format or a particular type of image format. These conventional image formats perform encoding on the entire image information under a uniform resolution or a uniform compression method.

Thus, the conventional electronic processing cannot change the resolution or compression method so as to encode an important portion of the original information under a high resolution, while an unimportant portion is encoded under a low resolution, in order to increase compression efficiency of data.

Furthermore, when the original image includes many types of information, such as documents and photographs, the conventional method cannot increase the compression efficiency of data by partially changing encoding resolution or a compression method for each portion of the document and photographs, based on the characteristics of the information.

Furthermore, it is impossible for the conventional apparatus and method to provide an external reference in order to incorporate an image being stored in another image file as a part its own image and display the images.

Thus, it is impossible for conventional image filing devices to perform encoding and electronically processing the images by partially changing the resolution or compression ratio into a different value based on each part of the original information. Furthermore, the conventional image filing devices cannot provide exterior references from another image file.

SUMMARY OF THE INVENTION

The present invention is intended to overcome the above-mentioned disadvantages of an image filing device. Therefore, one object of the invention is to provide an image filing device and method for performing a partial electronic processing of an image based on each plurality areas of the image.

Another object of the invention is to provide an image filing device and method that can incorporate an image of another electronic file as its own image.

Further object of the invention is to provide an image filing and reproducing device and method that can reproduce a whole image by reading an electronic file being generated in an image filing device and method, partially restoring, incorporating an image in another electronic file and composing the images.

Still, further object of the invention is to provide an image filing device and method that reads an electronic file being generated in an image filing device and method, partially reproduce, incorporate an image in another electronic file and composite the images so as to reproduce an entire image of an original image.

In accordance with the purpose of the invention as embodied and broadly described herein, the invention comprises an image filing device. The device comprises means for analyzing layout structure of an original image; means for acquiring a plurality of partial image data by respectively encoding each plurality of areas of the original image based on the analyzed layout; means for generating an electronic file by affixing attribute data required for a reproduction of the original image to each of the plurality of partial image data.

Moreover, the method further comprises an image reproducing device comprising means for reading out an electronic file generated in an image filing device that includes means for analyzing a layout structure of an original image; means for acquiring a plurality of partial image data by respectively encoding each plurality of areas of the original image based on the analyzed layout; means for generating an electronic file by affixing attribute data required for reproduction of the original image to each of the plurality of partial image data; and means for reproducing the original image by decoding the plurality of partial image data based on the affixed attribute data.

Another aspect of the present invention is a method for filing data comprising analyzing layout structure of an original image; acquiring a plurality of partial image data by respectively encoding each plurality of areas of the original image based on the analyzed layout; and generating an electronic file by affixing attribute data required for reproduction of the original image of the plurality of partial image data.

Further in accordance with the present invention is a method for reproducing an image comprising reading an electronic file generated by an image filing method that includes analyzing layout structures of an original image; acquiring a plurality of partial image data by respectively encoding each plurality of areas of the original image based on the analyzed layout; generating an electronic file by affixing attribute data required for reproduction of the original image to each of the plurality of partial image data; and reproducing the original image by decoding the plurality of partial image data based on the affixed attribute data.

BRIEF DESCRIPTION OF THE DRAWINGS

A more complete appreciation of the present invention and many of the advantages thereof will be better understood by reference to the following detailed description, when considered in connection with the accompanying drawings.

FIGS. 6A–6F illustrate examples of the file structures that put each of the attribute data and the corresponding real data together for the respective partial images;

Reference will now be made in detail to embodiments of the present invention, examples of which are illustrated in accompanying drawings.

DESCRIPTION OF THE PREFERRED EMBODIMENTS

The present invention solves the above-mentioned problems and defects. More particularly, the embodiments consistent with the present invention do not uniformly change an image into electronic data, but performs a layout analysis of the original image and acquires partial image data by encoding the respective areas in accordance with the layout. The embodiments then generate an electronic file by affixing information that is necessary for reproducing the original image to respective partial image data. During a reproduction of the image file, the image file is reproduced by reproducing the partial image data and by combining the partial image for each plurality of areas in accordance with the information. Further, it becomes possible to provide an external reference of an image data in a first electronic file by defining a file name of a second electronic file as the information.

Figure 1:
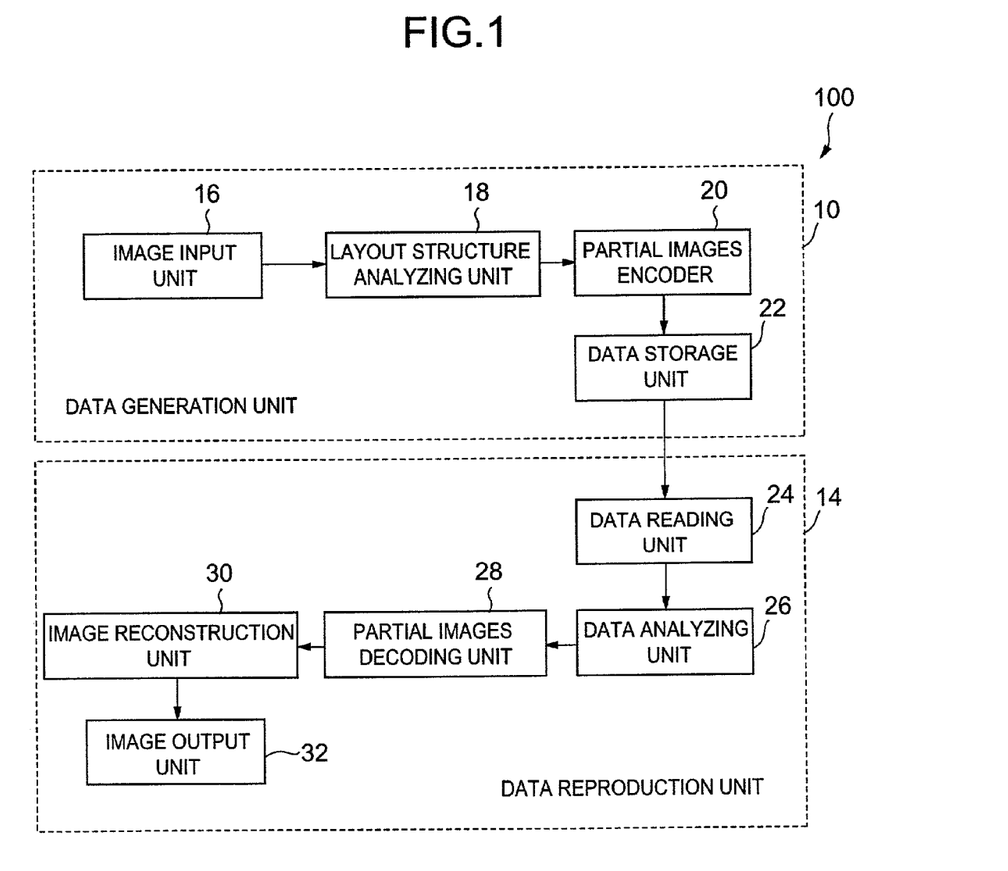
FIG. 1 is a block diagram showing configuration of a first embodiment of the image filing device consistent with the invention.

FIG. 1 illustrates a whole system of an image filing device 100 of an embodiment consistent with the invention. For convenience of explanation, a data generation unit 10 for generating an electronic file and for storing it, and a data reproduction unit 14 for reproducing the stored electronic file, are shown as separate units. However, both units may be practically unified in an actual device.

The data generation unit 10 includes an image input unit 16, a layout structure analyzing unit 18, a partial images encoder 20, and an data storage unit 22. The image input unit 16 may comprise a scanner or a digital camera. Thus, the image input unit 16 acquires an original image by converting a variable density of an original paper, such as a document or a photograph, into electric signals. Further, the image input unit 16 inputs images by reading out an electronic file of electronic images that is generated in another device or processed for generating documents under an application.

The electronic image is supplied to a layout structure analyzing unit 18. After analysis of the layout from the analyzing unit, each plurality of areas is classified into areas such as a document area, a photograph/drawing area, an illustration area, and a table/ruled lines area. A plurality of partial images for each of the plurality of areas is extracted from one image.

Each of the partial images is supplied to the partial images encoder 20 for encoding each of the plurality of areas to determine the characteristics of the respective areas. There are several kinds of encoding systems, such as JIF, JPEG, and TIFF. However, when the same coding system is applied to either one of the several encoding systems, it is possible to change the resolution or compression rate for each of the partial images. Further, it is possible for each of the partial images to set up an existence of an encipher. Since each of the areas is encoded with an existence of an encipher, it also becomes possible to encode only required portions of the partial images. In other words, it is possible to avoid encoding unnecessary portions of partial images, consequently reducing the amount of data.

The respective encoded data for each of the areas are collected as partial image data by the data storage unit 22. Thus, the data storage unit 22 collects the respective encoded data with an encoding system that has an existence of an encipher, and an attribute data including a position of each of the plurality of areas relating to a layout structure of a partial image. Then the data storage unit 22 stores the plurality of partial images for one original electronic file. In addition, the attribute file is stored in a header for the plurality of partial image data.

The data reproduction unit 14 includes a data reading unit 24, a data analyzing unit 26, a partial image decoding unit 28, an image reconstruction unit 30, and an image output unit 32.

The data reading unit 24 reads out a necessary electronic file from the data storage unit 22 in order to output the stored image. Then the data analyzing unit 26 picks up the partial image data from the read out electronic file. The partial images decoding unit 28 decodes each of the partial image data based on a system in accordance with the attribute data. The image reconstruction unit 30 performs a reconstruction of an original image based on each of the decoded partial images and information in the attribute file. The image output unit 32 outputs the original image. An output device such as a printer or a display device is used as the image output unit 32. It is also possible to store the original image by converting into another image format, such as a PDF file.

As explained above, according to the embodiment consistent with the invention, one sheet of an image is not uniformly processed into electronic data, but it is processed in a different system for the respective partial areas of the one sheet of the image depending upon a classification for each plurality of areas, such as a document area or a photograph area. Thus, the one sheet of image is partially processed into electronic data in various different systems for each of the partial areas. The plurality of partial image data becomes an electronic file with affixing attribute data information required for a reproduction of the original image. During a reproduction of the electronic file, the original image is reconstructed by reproducing the partial image data and by combining the respective partial image data in accordance with the respective attributes.

By reconstructing the original image, it becomes possible to reduce a total amount of data by encoding necessary portions of the partial image data while keeping a lot of the data amount. Other portions of the partial image data are encoded under a lower quality or the encoding is avoided for unnecessary portions. Consequently, the invention has an advantage because it becomes possible to store data by transferring data at a high speed through a network. Furthermore, since the encoding is performed for each of the partial images, it becomes possible to easily and freely change the layout of the data by changing the attribute data only to position data, without changing the actual data of the image itself.

Furthermore, there is another advantage to the present invention in which the system can easily perform a reuse by picking up a partial image to applying it into another image.

A practical operation of the embodiment consistent with the invention is explained with reference to FIGS. 2A and 2B.

Figure 2A:
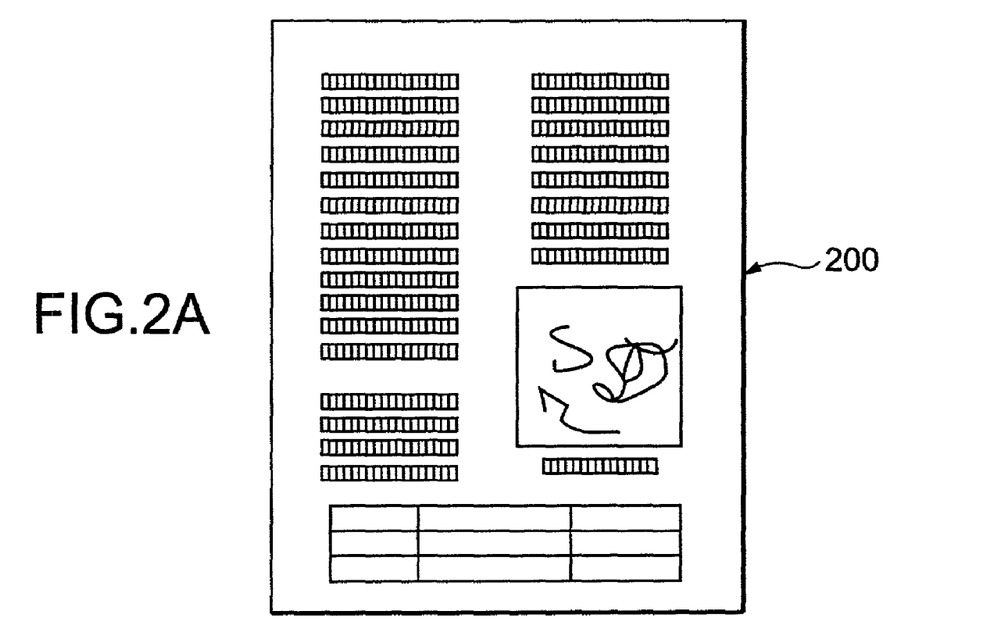
FIGS. 2A and 2B illustrates the layout structure analysis.
Figure 2B:
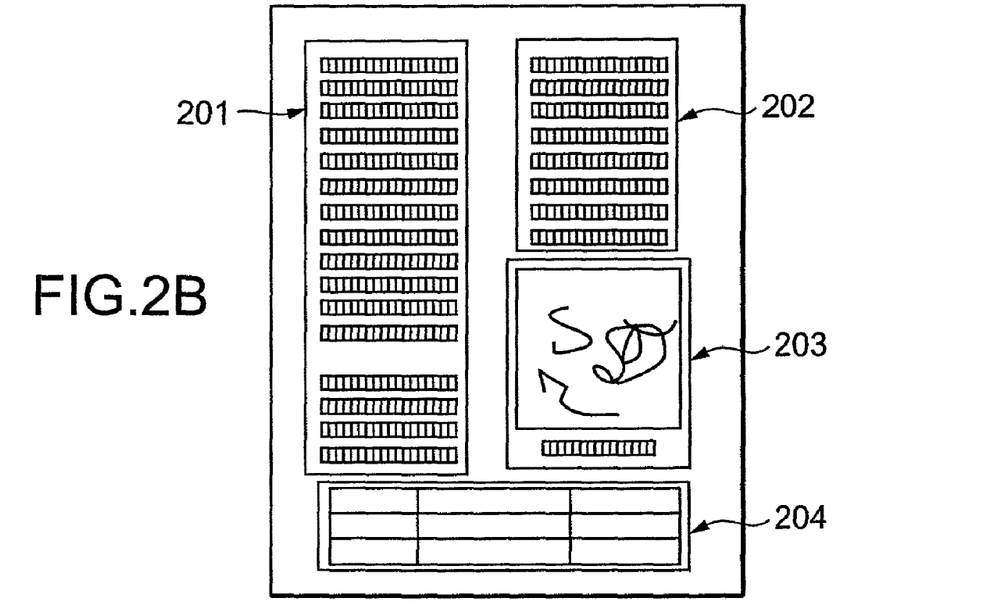

FIGS. 2A and 2B show a practical operation of the layout structure analyzing unit 18 in FIG. 1. When an image such as illustrated in FIG. 2A is inputted, the inputted image is classified into every classification of the partial images by applying a similar technique such as a layout analyzing technique for classifying a document image into character areas, photograph area and drawing/table areas as a pretreatment for a character recognition used in an Optical Character Recognition (OCR). In this example, when an image 200 in FIG. 2A is inputted, it is classified into character areas 201 and 202, a photograph/drawing area 203, and a table area 204 such as shown in FIG. 2B.

Figure 3:
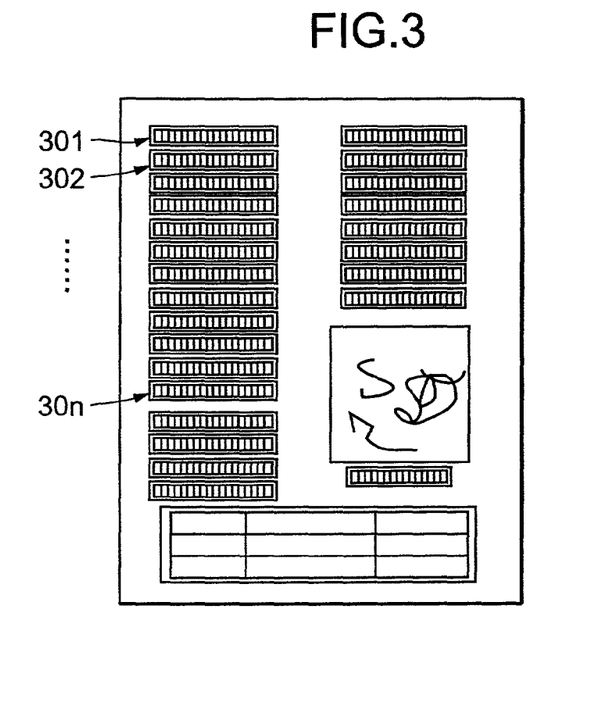
FIG. 3 illustrates an example of the layout analysis by classifying the character areas into each of lines.
Figure 4:
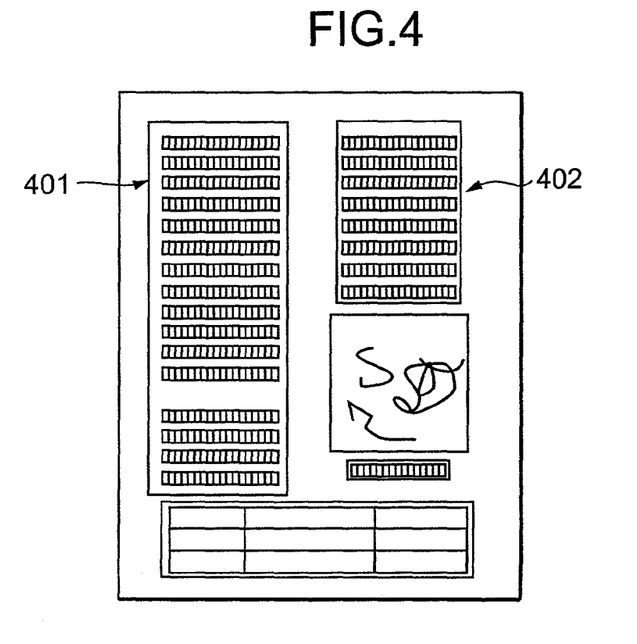
FIG. 4 illustrates another example of the layout analysis by classifying the character areas into each of block units.

The character areas in 201 and 202 can precisely be classified into each of line units 301, 302, - - - , 30n, as shown in FIG. 3. Further, it is also possible to divide the character areas into each of clustering block units 401 and 402 by bundling a plurality of lines, as shown in FIG. 4.

Figure 5:
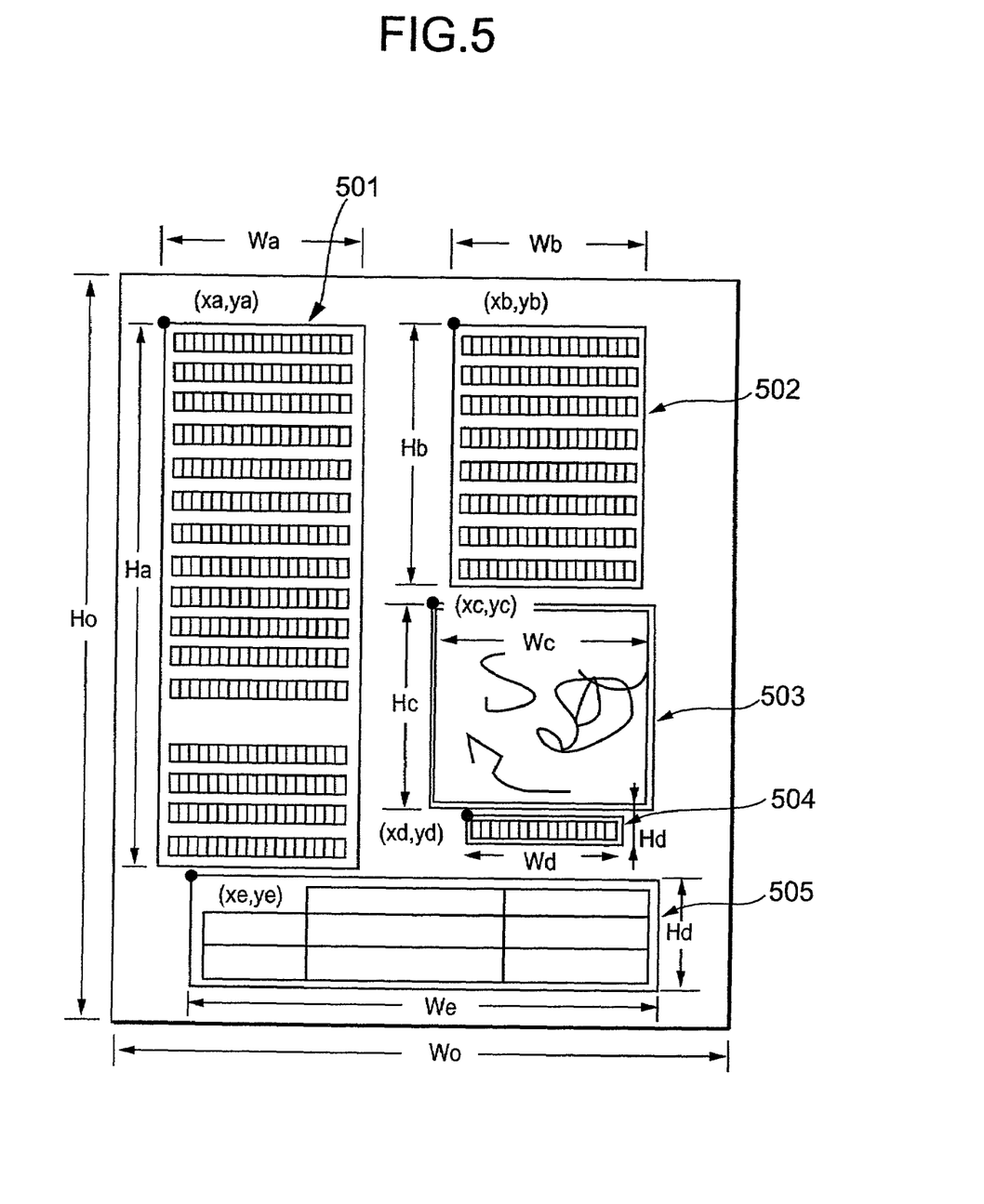
FIG. 5 shows each of attributes for each of the partial images.

Each of the partial image areas 501–505 is obtained by classifying and dividing each of the character areas as shown in FIG. 5. Each data for indicating each position of the respective partial images 501–505, such as coordinate values of two diagonal corners of a rectangle area, or coordinate value of the four corners of the rectangle area are detected and memorized. In FIG. 5, as an example, a coordinate value (xa, ya) of one corner, a width Wa, and a height Ha are memorized for the partial image 501. Further, a resolution of original image obtained from the image input unit 16, as a whole size (Wo, Ho) of the image obtained from the layout structure analyzing unit is also memorized.

Next, the partial images encoder 20 determines a particular encoding method for each of the classified partial image areas 501–505 based on each of the characteristics of the partial images, or based on an instruction made by a user. For example, the partial images of character areas 501 and 502 are treated as binary coded images so as to encode in a lower resolution in order to read the characters. At this time, it is also possible to compress the data by applying another compression method, such as the run-length compression. As for the partial image of the photograph/drawing area 503, the area is encoded under a specified resolution by a user, a preliminary designated resolution, or under the resolution for the original image. The encoding system used for this encoding operation is symbolized and stored as the attribute data together with image data.

When the encoding of all of the partial images 501–505 is completed, or when each of the partial image is encoded, the encoded data and its attribute data are associated. For example, the data for a partial image X can be memorized in the data storage unit 22 as a following format, where the symbol "#" indicates a data item.

Partial image X
Resolution
Position (x1, y1)/(x2, y2)
Data size
Coding system
A start position of coding data
Enciphering key
Encoding data
. . . . . .
Encoding data Thus, each partial image data is comprised of an actual encoding data, i.e., real data or its attribute data. Furthermore, the plurality of partial image data for constructing one sheet of original image is collectively associated as one electronic file. The following attribute data for reproducing the one original image from the partial images is stored as header information on this electronic file.

Resolution of a reproduced image
A size of the reproduced image
Number of the partial images
Start position of the partial image data (address offset)

In FIG. 5, each of the measured attribute data for the respective partial images 501–505 from the original image is shown.

Furthermore, it is also possible to add such common color table in the partial images 501–505 by defining the data below for each of the partial images.

color attribute
offset to a color map
color map data
. . . . . . . . .
. . . . . . . . .

As for the original image illustrated in FIG. 5, when an electronic file is generated with the above-mentioned methods, data structures such as shown in FIGS. 6A–6F are obtained. FIG. 6A shows a data structure for a header portion. The header indicates that the resolution of the reproducing image=400 dpi, the size of the reproducing image=Wo (width)×Ho (Height), the number of the partial images=5 i.e., partial images 501–505, and the start position of the partial image data=0×43. FIGS. 6B–6F indicate the respective image data for the respective partial images 501–505. For example, FIG. 6B illustrates partial image data 501 comprising the resolution of the image data=200 dpi, the position is (xa, ya)/(xa+Wa, ya+Ha), the data size=XXXX byte, the encoding system (of symbolized)=0, the start position of encoding data=0×132, the enciphering key (of symbolized)=0, and the start position of the encoded data (start position=0×132).

Figure 7:
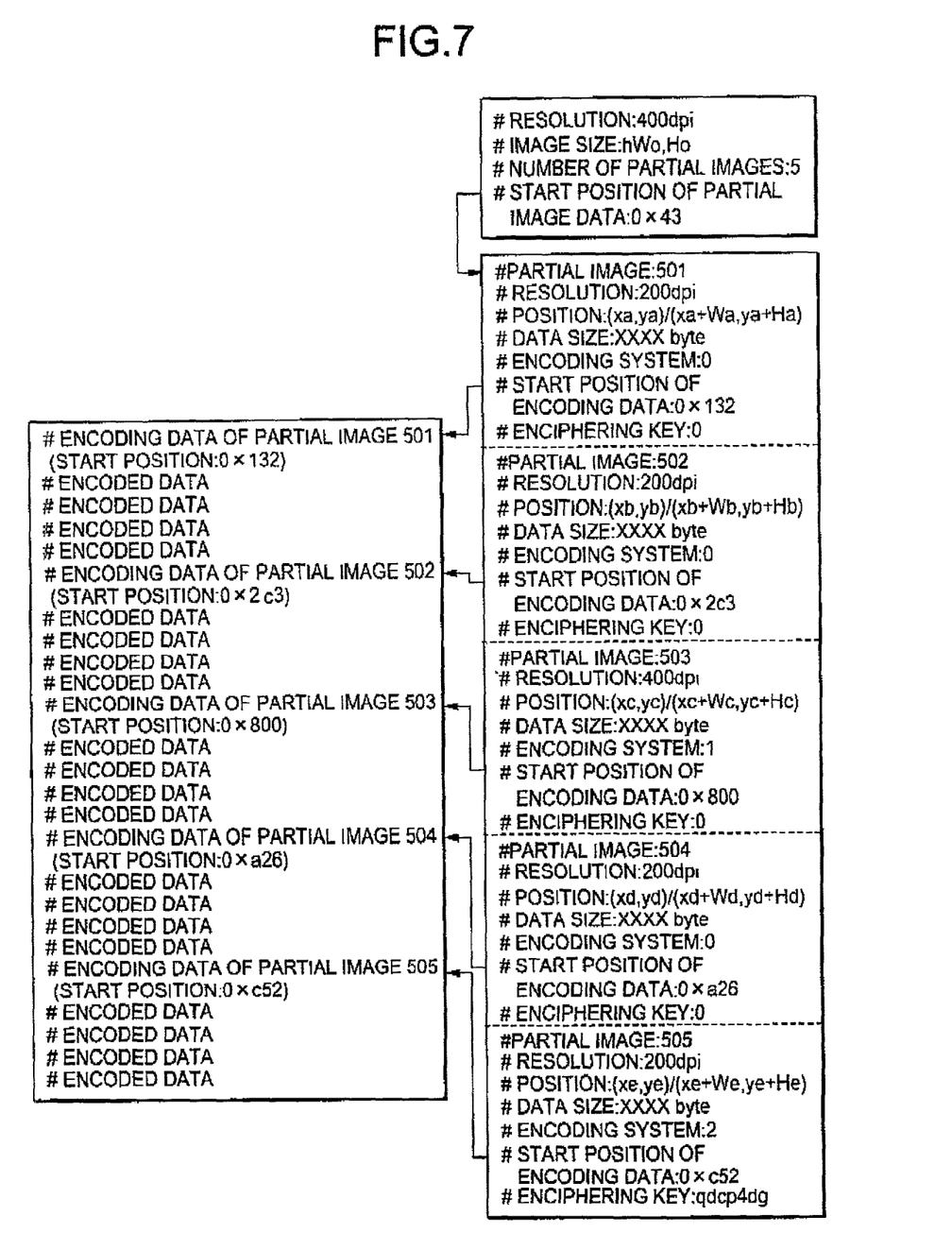
FIG. 7 illustrates an example of the file structure that puts the respective attribute data and real data together.

In FIGS. 6A–6F, the file format gathers the real data and the attribute data for each of the plurality of partial images 501–505. FIG. 7 shows an example of a file construction where every attribute data is separated from the collection of every real data. The file constructing becomes possible to flexibly designate the position for storing the real data. Further, each of the start positions for the respective data can be referenced by "the start position for the encoded data" among the attribute data.

Figure 8:
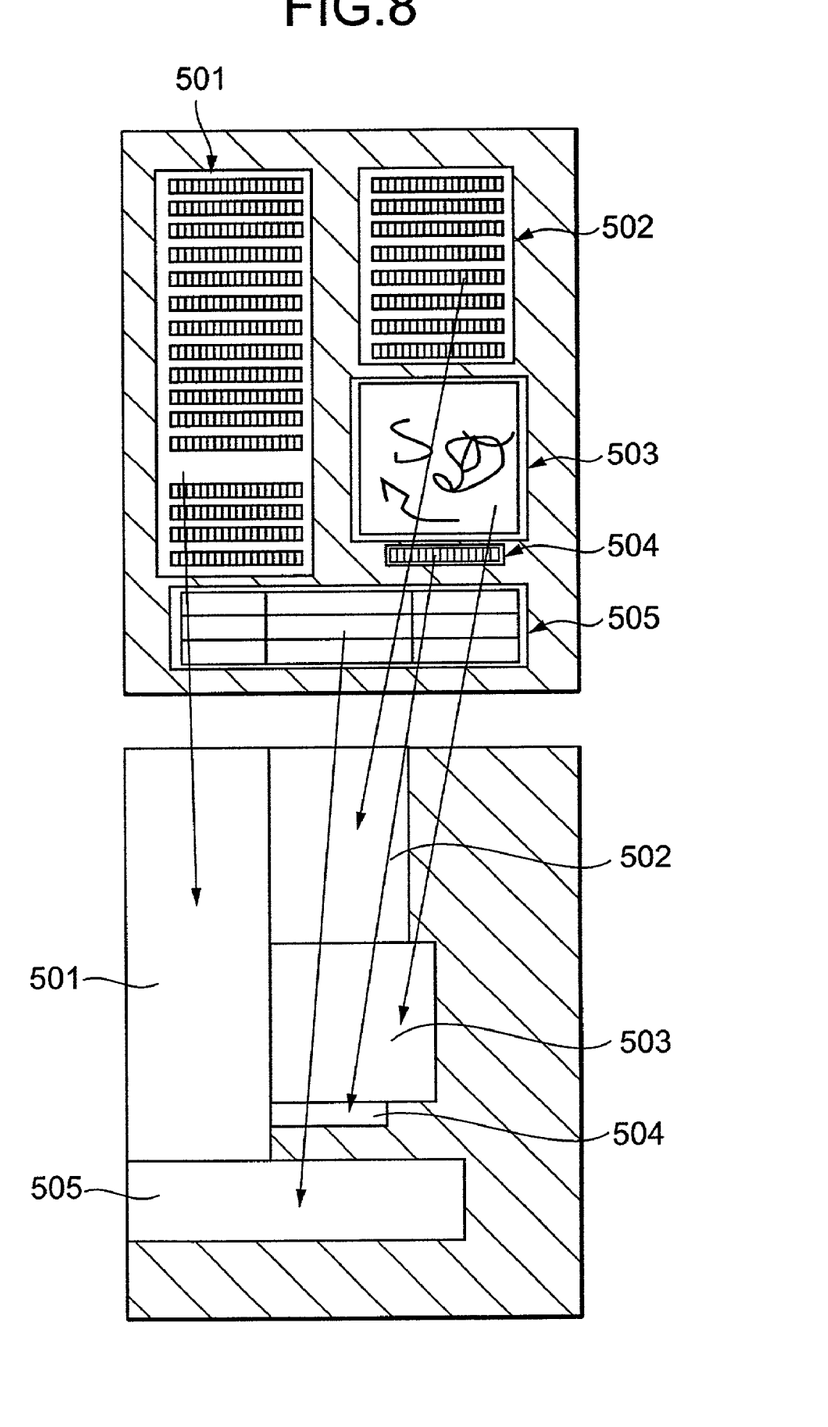
FIG. 8 is a diagram illustrating data of the changed areas from an original image into data that is distinguished from the non-changed areas.

FIG. 8 illustrates slash lines that represent stored encoded data for respective partial images 501–505. By storing each of the encoded data, non-data areas are generated and compared to the conventional method for encoding the entire image. Thus, it becomes possible to easily compress the image size while the details for the image, such as the resolution for the necessary portions and the size, are kept at a required degree. The more blank areas exist in the original image, the more effective the compression of the image size can be obtained.

Figure 9:
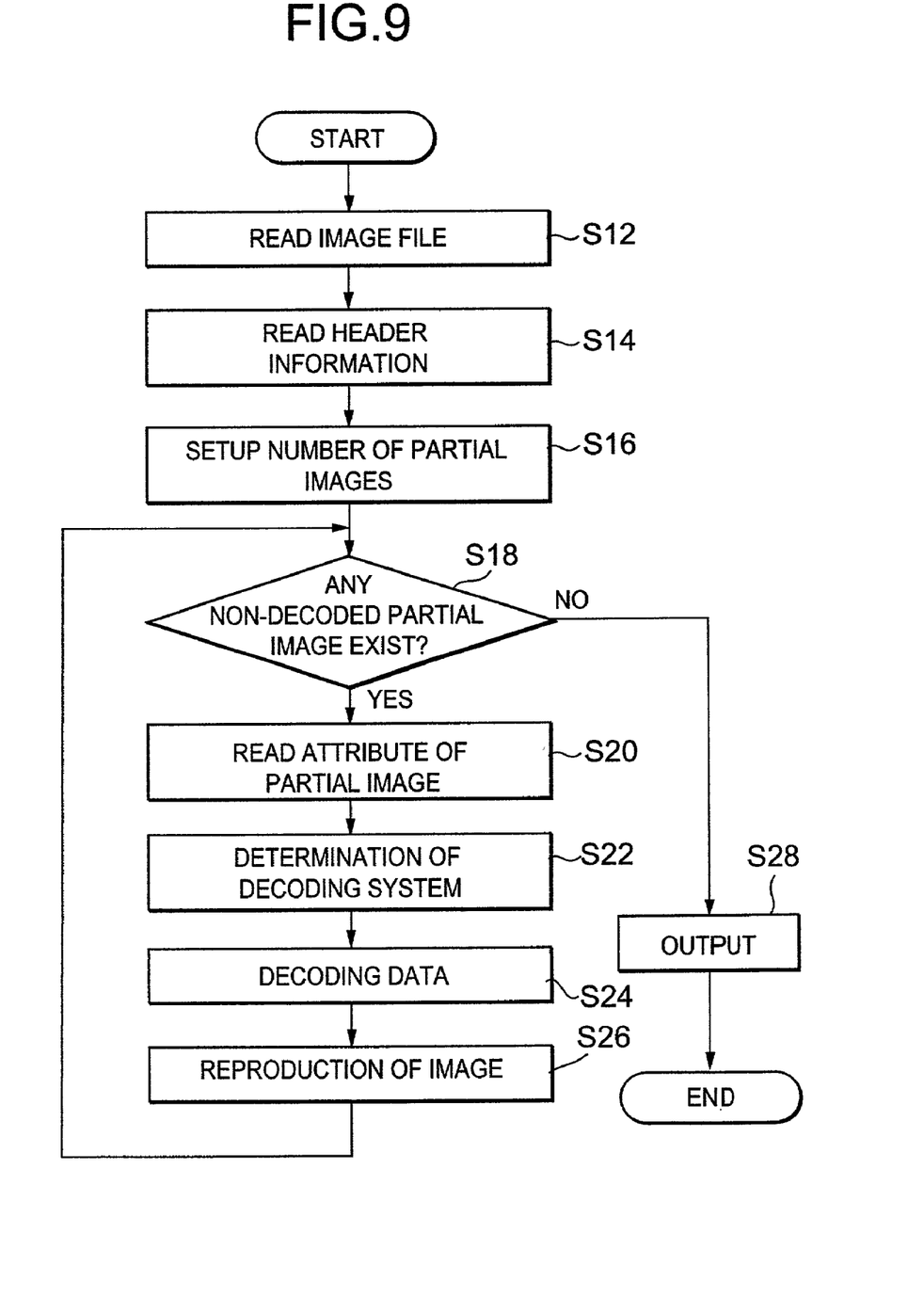
FIG. 9 is a flowchart illustrating a reproducing process of an image file.

Next, FIG. 9 illustrates a flow-chart of the operation of the data reproduction unit 14 in FIG. 1. The data reproduction unit reproduces the original image from the image data file that is stored in this system.

When the data reading unit 24 reads the image file stored in the data storage unit 22 (step S12), the header information in FIG. 6A is read out from the image file (step S14). The data analyzing unit 26 sets up the number of the partial images in the header information. Further, based on the header information, the data analyzing unit 26 sets up data according to the size and resolution for reproducing the original image (step S16).

Based on the setup data, it is determined whether or not any non-decoded partial images exist (step S18). When non-decoded partial images exist, the attribute data for one partial image data e.g., the partial image 501, is read out (step S20). Since the encoding system and various setups are specified from the attribute data, a particular decoding system is determined (step S22), then decoding of the partial image is performed by the partial images decoding unit 28 (step S24). The image reconstruction unit 30 writes out the decoded partial image at the image positions indicated in the attribute data (step S26). The process between step S18 and step S26 is repeated until non-decoded partial image does not exist.

When the decoding of every partial image has completed, the image output unit 32 outputs a reconstructed image in accordance with an output medium (step S28).

As explained above, this embodiment method of the invention includes, analyzing layout structure of an image, classifying the image into classifications of partial images by using a result of the analysis, encoding the partial images independently, and storing the independently encoded data as one image data based on a predetermined format. Further, the embodiment method includes reading the storage image data, taking out a decoding information for a partial image and a layout construction information for the partial image from the read out data, decoding the partial image, and reconstructing the original image by arranging the partial images on one sheet. Thus, it becomes possible to increase the compression efficiency by encoding important portions under a high resolution while unimportant portions are encoded under a lower resolution. Further, when the image includes a plurality of classified information, it also becomes possible to increase the compression efficiency by performing the encoding operation with changing the resolution or the compression system for each classification of the partial images based on the classified information. Consequently, the stored data amount of an input image is reduced, without reducing the resolution in order to keep the detail data for the necessary portions of the partial images. Further, it is also possible to easily change the layout or the construction without changing the image data itself. By partially enciphering the image, security is increased, since a total image can be obtain, but the important detailed portions can not be understood.

This invention is not limited to the embodiment as explained above, but can be performed on various formats. For example, the attribute data is not restricted to the items mentioned above. Moreover, it is possible to write information by extending, when it is needed.

Figure 10A:
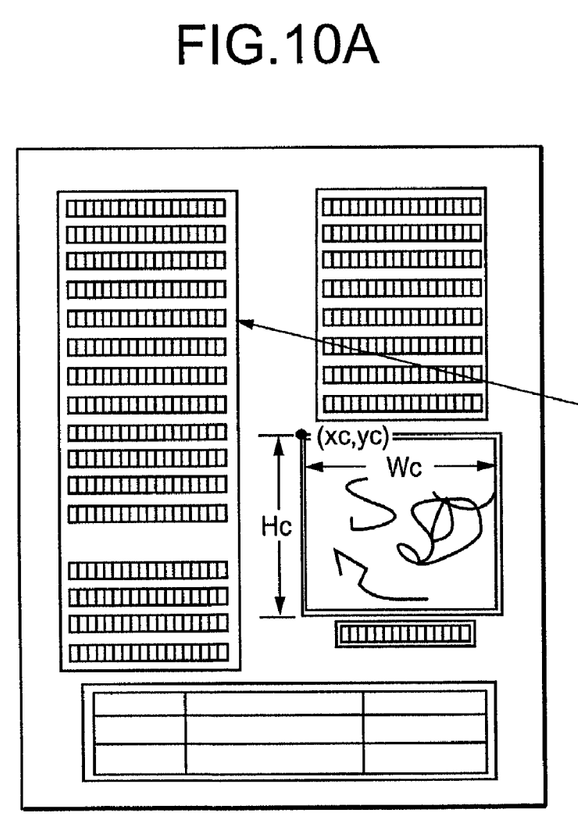
FIGS. 10A and 10B illustrate and explain the partial image data when the character code data is included as an image data.
Figure 10B:
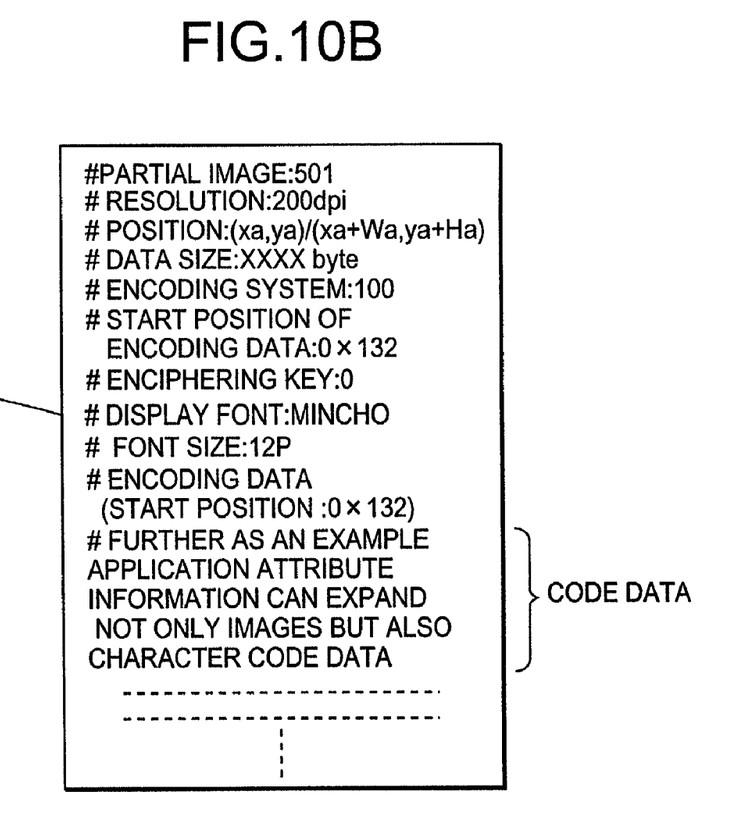

As for the partial image of the character area, it is also possible to store character code data that is obtained by a character recognition through an OCR, such as shown in FIGS. 10A and 10B. In this case, if a display font and size are added as attribute data, it becomes possible to easily change the character image by specifying the display font and the font size for a display.

Figure 11A:
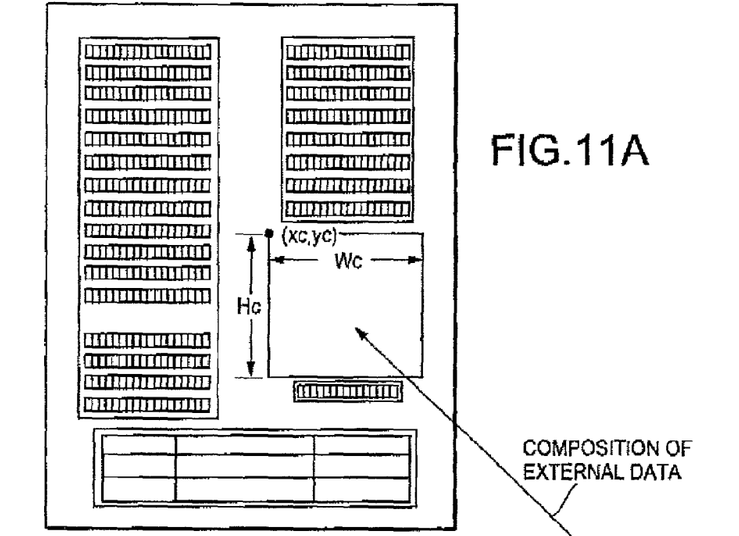
FIGS. 11A–11C illustrate the partial image data that is constructed in order to be able to refer to an external data.
Figure 11B:
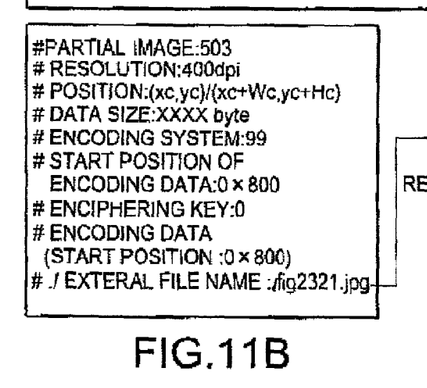
Figure 11C:
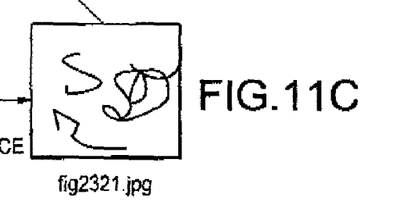

Furthermore, it is possible to reconstruct the partial image data so that it may have an external file name as the attribute data, such as shown in FIG. 11C. The external file name is not the actual data. Therefore, it is possible to not have the actual data in the corresponding partial images data file, but to refer to other data files in order to reproduce an original image. By referring to other data files, it becomes possible to reduce the data amount of the original image by preliminarily storing only data of a blank list from a predetermined regular line structure or layout like a list. When the entered data in the list is referenced, only the filled-in data is encoded by decomposing the partial images and a frame portion of the list is described as an exterior reference data. Furthermore, it is also possible to easily replace data of a certain part in the list with other data by referencing external data. It is also possible to reproduce and output data by referencing not only to the image data but also to the text data when it refers to an external data.

Furthermore, if the image includes a plurality of classifications of documents or photographs, it becomes possible to increase compression efficiency by changing the resolution and the compression method for every portion of the documents or photographs. Moreover, the layout or the composition can easily change without changing the picture data itself. Furthermore, security of data for an important portion can be enhanced by enciphering secret areas.

One of ordinary skill will recognize that the embodiment consistent with the invention can also be performed as a computer readable recording medium that records programs for realizing the determined functions.

It will be apparent to those skilled in the art that various modifications and variations can be made in the context of the present invention and in its practice without departing from the scope of the scope and spirit of the invention.

What is claimed is:

1. An image filing device comprising:
   means for analyzing layout structure of an original image;
   means for acquiring a plurality of partial image data by respectively encoding a plurality of areas of the original image based on the analyzed layout;
   means for generating respective attribute data for the plurality of separate areas, wherein the attribute data include at least a physical position of the plurality of separate areas relating to the layout structure;
   means for associating the respective attribute data with the plurality of partial image data; and
   means for generating an electronic file by including the plurality of partial image data, associated with the respective attribute data, and affixing separate data corresponding to reproduction of the original image and to the plurality of partial image data.

2. The image filing device of claim 1, wherein the analyzing means classifies the original image into different classifications of areas.

3. The image filing device of claim 2, wherein the different classifications of areas includes at least two separate areas among a character area, a photograph area, a drawing area, or a table area.

4. The image filing device of claim 3, wherein the analyzing means divides the classified character area into line units.

5. The image filing device of claim 3, wherein the analyzing means divides the classified character area into clustering block units.

6. The image filing device of claim 1, wherein the attribute data further includes data for referring to a different electronic file.

7. The image filing device of claim 1, wherein the attribute data further includes a resolution number of a corresponding partial image data.

8. The image filing device of claim 1, wherein the attribute data further includes a size of a corresponding partial image data.

9. The image filing device of claim 1, wherein the attribute data further includes an enciphering key of a corresponding partial image data.

10. The image filing device of claim 1, wherein the attribute data further includes a color attribute of a corresponding partial image data.

11. An image reproducing device, comprising:
   means for reading out an electronic file generated in an image filing device that includes means for analyzing a layout structure of an original image;
   means for acquiring a plurality of partial image data by respectively encoding a plurality of separate areas of the original image based on the analyzed layout;
   means for generating respective attribute data for the plurality of separate areas, wherein the attribute data include at least a physical position of the plurality of separate areas relating to the layout structure;
   means for associating the respective attribute data with the plurality of partial image data;
   means for generating an electronic file by including the plurality of partial image data, associated with the respective attribute data, and affixing separate data corresponding to reproduction of the original image and to the plurality of partial image data; and
   means for reproducing the original image by decoding the plurality of partial image data based on the affixed attribute data.

12. The image reproducing device of claim 11, wherein the separate data further includes a resolution of the reproduced original image.

13. The image reproducing device of claim 11, wherein the separate data further includes a size of the reproduced original image.

14. The image reproducing device of claim 11, wherein the separate data further includes a total number of the plurality of partial image data.

15. A method for filing data, comprising:
   analyzing layout structure of an original image;
   acquiring a plurality of partial image data by respectively encoding a plurality of separate areas of the original image based on the analyzed layout; and
   generating respective attribute data for the plurality of separate areas, wherein the attribute data include at least a physical position of the plurality of separate areas relating to the layout structure;
   associating the respective attribute data with the plurality of partial image data; and
   generating an electronic file by including the plurality of partial image data, associated with the respective attribute data, and affixing separate data corresponding to reproduction of the original image and to the plurality of partial image data.

16. A method for reproducing an image, comprising:
   reading an electronic file generated by an image filing method that includes analyzing layout structures of an original image;
   acquiring a plurality of partial image data by respectively encoding a plurality of separate areas of the original image based on the analyzed layout;
   generating respective attribute data for the plurality of separate areas, wherein the attribute data include at least a physical position of the plurality of separate areas relating to the layout structure;
   associating the respective attribute data with the plurality of partial image data;
   generating an electronic file by including the plurality of partial image data, associated with the respective attribute data, and affixing separate data corresponding to a reproduction of the original image and to the plurality of partial image data; and
   reproducing the original image by decoding the plurality of partial image data based on the affixed separate data.

* * * * *